United States Patent [19]
Autier et al.

[11] Patent Number: 4,999,686
[45] Date of Patent: Mar. 12, 1991

[54] SEMICONDUCTOR DEVICE COMPRISING AN INTEGRATED OPTICAL GUIDE, WHICH HAS AT LEAST ONE RECTILINEAR PART AND ONE CURVED PART

[75] Inventors: Philippe Autier; Marko Erman, both of Paris; Jean-Marc Auger, Joinville-Le-Pont, all of France

[73] Assignee: U.S. Philips Corporation, New York, N.Y.

[21] Appl. No.: 362,726

[22] Filed: Jun. 6, 1989

[30] Foreign Application Priority Data

Jun. 24, 1988 [FR] France .................. 88 08503

[51] Int. Cl.$^5$ .......................... H01L 29/161
[52] U.S. Cl. ........................ 357/16; 357/30; 357/19; 357/55; 350/96.120; 350/96.11
[58] Field of Search .............. 357/30 E, 30 L, 30 D, 357/30 G, 30 R, 16, 19, 55; 333/239, 248, 249; 350/96.12, 96.11, 96.1, 96.3, 96.31

[56] References Cited

U.S. PATENT DOCUMENTS

| 4,207,587 | 6/1980 | Hanes et al. ............. 357/30 M X |
| 4,500,164 | 2/1985 | Kiyohara ................. 357/30 L X |
| 4,897,622 | 1/1990 | Cheo et al. ............. 357/30 E X |

FOREIGN PATENT DOCUMENTS

| 0349038 | 1/1990 | European Pat. Off. . |
| 63-232368 | 9/1988 | Japan ....................... 357/19 |

OTHER PUBLICATIONS

Howard, "Structure for Optical Coupling to Thin-Semiconductor Layers," IBM Technical Disclosure Bulletin, vol. 14, No. 12, May 1972, 3787–3788.
Cinguino et al., "Monolithic Integrated InGaAcAs/Inp Ridge Wave Guide Photodiodes for 1.55 μM Operation Grown by Molecular Beam Epitaxy" Appl. Phys. Lett. 50(21) 25 May 87, 1515–1517.
Liou et al., "Monolithic Integrated InGaAsP/InP Distributed Feedback Laser Y-Branching Waveguide and a Monitoring Photodetector Grown by Metalorganic Chemical Vapor Deposition," Appl. Phys. Lett. 54(2), 9 Jan. 1989, pp. 114–116.
K-H. Tietgen, "Probleme der Topographic Integriert-Optischer Schaltungen", Frequenz, vol. 35, No. 9 (Sep. 1981), pp. 247–252.
P. C. Kendall et al., "Rib Waveguide Curvature Loss: The Scalar Problem", IEEE Proceedings, vol. 132, Pt. J., No. 2 (Apr. 1985), pp. 140–145.
S. K. Korothy et al., "Greatly Reduced Losses for Small-Radius Bands in Ti: LiNb03 Waveguides", Applied Physics Letters, vol. 48, No. 2 (Jan. 1986), pp. 92–94.
B. Schuppert, "Reduction of Bend Losses in Ti: LiNb03 Waveguides Through MgO Double Diffusion", Electronics Letters, vol. 23, No. 15 (Jul. 16, 1987), pp. 797–798.

Primary Examiner—William Mintel
Attorney, Agent, or Firm—Emmanuel J. Lobato

[57] ABSTRACT

A semiconductor device comprising an integrated optical guide, which has at least one rectilinear part and one curved part, and comprising means for obtaining the confinement of the light in the guide in the curved part, which means include a groove provided along the edge of the guide in the region of the curve part, characterized in that these means also include a guide structure comprising a guiding layer and, overhanging the guiding layer, a ribbon in relief for determining the optical path followed by the light in the guiding layer, and in that these means moreover include a groove structure such that it has a constant depth, that its central part follows exactly the edge of the guiding ribbon in the curved part, that its ends are removing from the edge of this ribbon at the beginning and at the end of the curved part, that its bottom is disposed in the guiding layer at a level which does not reach the lower part of this guiding layer.

22 Claims, 11 Drawing Sheets

SEMICONDUCTOR DEVICE COMPRISING AN INTEGRATED OPTICAL GUIDE, WHICH HAS AT LEAST ONE RECTILINEAR PART AND ONE CURVED PART

BACKGROUND OF THE INVENTION

The invention relates to a semiconductor device comprising an integrated optical guide, which has at least one rectilinear part and one curved part, and comprising means for obtaining confinement of the light in the guide in the curved part, which means include a groove provided along the edge of the guide in the region of the curve.

The invention further relates to a method of manufacturing such a device.

The invention is used in the manufacture of integrated optical devices, such as, for example, Mach-Zehnder modulators or optical switches, which comprise guides having different curvatures, each guide comprising successively rectilinear parts and curved parts.

It is known from the publication entitled "Probleme der Topographie Integriert-Optischer Schaltungen" by Karl-Heinz Tietgen in "2213-Frequenz Vol. 35 (1981), September No. 9, Berlin-Deutschland", p. 248, to manufacture buried guides having a curved part.

The buried guide is simply constituted by an index ribbon higher than that of the substrate, this ribbon being obtained by implantation of titanium into the substrate of $LiNbO_3$ and therefore it is at one level with the upper flat surface of said substrate. Such a completely buried guide always exhibits high losses.

In order to reduce the losses by radial diffusion into the curved part of the guide, this document indicates the formation of a groove, for example by etching, which exactly follows the edge of the buried guide having a larger radius of curvature and has the same height as the latter. This etched groove permits of enlarging the index jump between the guide and the atmosphere outside the guide on the side of the edge of the guide having a larger radius of curvature.

By this method according to the cited document, radii of curvature can be attained of the order of 0.5 mm with losses not exceeding 3 dB.

This document also indicates that in the manufacture of such curved guides losses are caused by diffusion due to the roughness of the edges of the guide with respect to the external atmosphere and that these losses are larger as the index jump is larger: and that other problems also have to be taken into account, which are connected with this index jump, if the latter is large, such as reflection, radiation and conversion of the mode.

In order to reduce these disadvantages, the etched groove has at its ends coinciding with the beginning and the end of the bend or curved part of the guide a bottom rising with a slight inclination towards the upper surface of the substrate so that the buried guide is only laterally confined by the substrate of lower index in the rectilinear parts.

The optical losses by radiation in the curved guides on the other hand have also been considered and described in the publication of "Marcatili and Miller" in "Bell Syst. Techn. 48, 2161 (1969)".

When an optical wave reaches the curved part of an optical guide, this wave must be adapted. For this purpose, a part of the energy carried is then converted into radiative modes. The energy then radiates in a dispersive manner parallel to the plane of guidance.

These losses by radiation are a consequence of the fact that, in order to maintain the same phase speed in the curved part, outside the bend, the electromagnetic field would have to be displaced at a speed higher than the speed of the light in the atmosphere. In fact, in order that the wave front is preserved and is displaced according to wave planes at a constant angular speed, it is necessary that the tangential phase speed is proportional to the distance between the considered point and the center of curvature of the guide. There is a given distance D adjusted from the outer edge of the ribbon constituting the wave guide, beyond which the speed of propagation is lower than the phase speed necessary to preserve the wave front. Consequently, from this distance, the mode can no longer propagate and the light radiates in the substrate situated in the convex part of the curve.

The conversion of the guided mode into a radiation mode is very penalizing for the monomode guides when they have radii of curvature of insufficient length.

A formula established by Marcatili and published by T. Tamir in "Topics in Applied Physics—Vol. 7" entitled "Integrated Optics", p. 133, gives the critical radius of curvature R as a function of the lateral confinement D of the mode, or more precisely as a function of the lateral extent of the evanescent waves and also as a function of the wavelength $\lambda$ used.

The radiative losses are no longer negligible when the radius of curvature of the guide satisfies the following inequality:

$$r < 24\pi^2 D^3/\lambda^2.$$

According to this formula, the more the lateral confinement increases, the smaller the radius of curvature of the guide can be without increasing the losses caused towards the exterior of the curvature.

For monomode guides, it can be deduced from this formula that the critical radius is of the order of 10 mm. It results therefrom that for radii of curvature smaller than 20 mm the losses by radiation begin to become substantial.

According to this formula, the indication is derived that it is necessary to increase the lateral confinement at the level of the curved part of the guides, which is perfectly in conformity with the indication of the first cited document.

However, according to the first cited document indicating the prior art, this problem is difficult to solve for the monomode guides due to the fact that the losses by diffusion and the rate of mode conversion increase simultaneously with the index difference with the confinement atmosphere.

Thus, the problems subsist to manufacture integrated optical guides having curved parts of much smaller radius of curvature than in the cited publications, typically 500 $\mu$m, and having very small losses both in the curved parts and in the rectilinear parts, especially smaller than 1 dB/cm.

These problems are solved by the means of the invention, which permit of obtaining such a confinement of the curved parts of the guides that the radiative losses are suppressed without increasing thereby the losses by diffusion or mode conversion, which means are moreover applied to a ribbon guide structure having much smaller losses in itself than the completely buried guide structure known from the prior art.

SUMMARY OF THE INVENTION

According to the invention, this object is achieved by means of an integrated device provided with the constitutive elements mentioned in the heading of claim 1 in conjunction with the constitutive elements mentioned in the characterizing part of this claim 1, thus characterized in that these means also include a guide structure comprising a guiding layer and, at right angles above said guiding layer, a ribbon in relief for determining the optical path followed by the light in the guiding layer, and in that these means moreover include a groove structure such that:

it has a constant depth, its central part follows exactly the edge of the guiding ribbon in the curved part, its ends are removed from the edge of this ribbon at the beginning and at the end of the curved part, its bottom is disposed in the guiding layer at a level which does not reach the lower part of this guiding layer.

In order that the invention may be readily carried out, it will now be described more fully with reference to the accompanying drawings, in which:

DESCRIPTION OF THE PREFERRED EMBODIMENTS

Figure 1A:
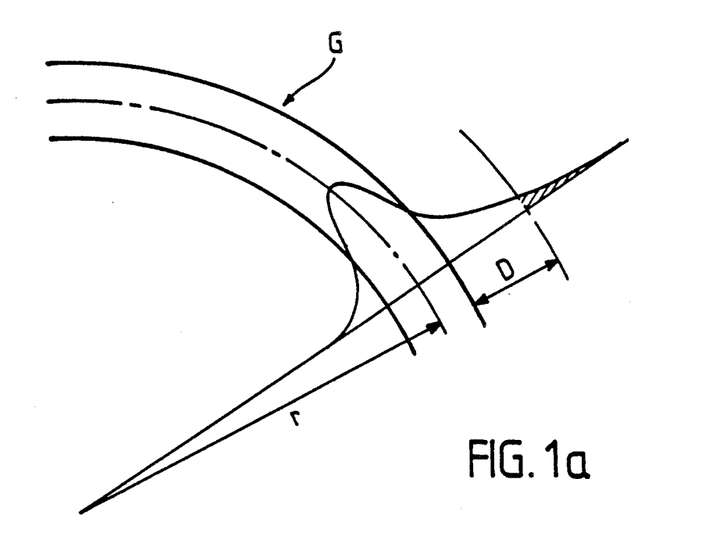
FIG. 1a shows the form of the wave in a curved monomode guide.
Figure 1B:
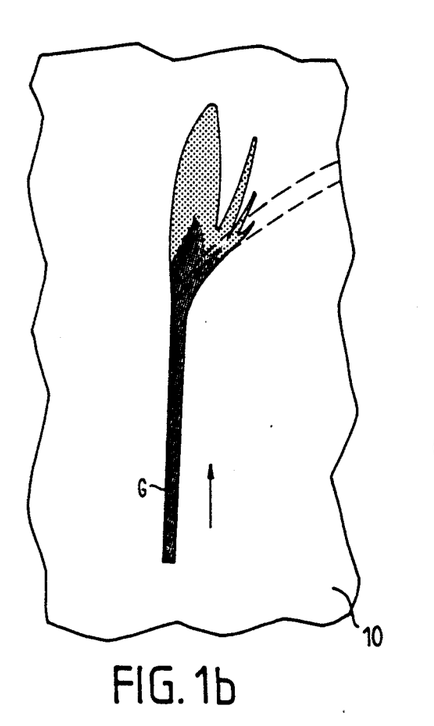
FIG. 1b shows, viewed from above, the path of a light beam in a curved guide not provided with the confinement means according to the invention.

FIG. 1a illustrated the fact that in a curved optical guide G having the radius of curvature r there is a certain distance D adjusted from the outer convex edge of the guide, beyond which the speed of propagation is lower than the phase speed necessary to preserve the wave bottom (shaded area). Consequently, from this distance D, the light is subjected to a radiation in the substrate. This is illustrated by FIG. 1b. This figure shows, viewed from above, the path of a light beam in a curved waveguide G not provided with the confinement means according to the invention. The course of the optical path shows that the light continues directly ahead and that practically all the energy of the guided mode is lost in the substrate 10, thus forming a major lobe and several minor lobes. The darkest zones correspond to high energy, the lightest zones to low energy. The light propagates in the direction of the arrow. FIG. 1b shows that, beyond the curved part of the guide, no more energy remains in that guide G, represented by dotted lines.

Figure 1C:
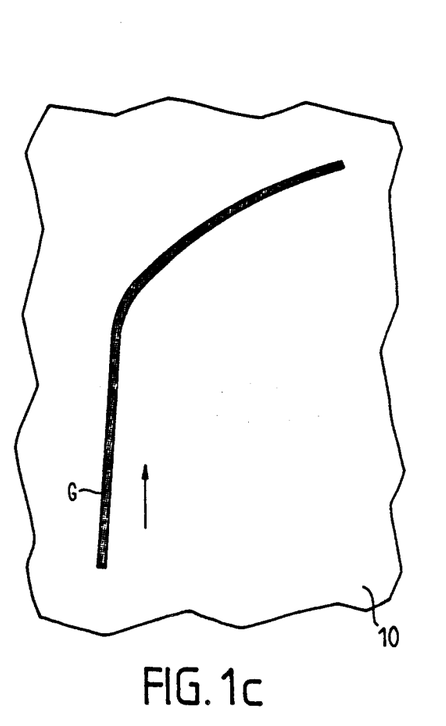
FIG. 1c shows, viewed from above, the path of a light beam in a curved guide provided with the confinement means according to the invention.

On the other hand, FIG. 1c shows, viewed from above the path of a light beam in a curved waveguide G provided with confinement means according to the invention. It is shown that all the energy of the guided mode practically remains in the guide beyond the curved part of the guide, the light propagating in the direction of the arrow.

However, if the information of the prior art is applied, which consists in that a groove is formed by etching along the edge of the guide in the convex part, another problem arises in that the guide becomes multimode from a transverse viewpoint, while the effective index difference between the guiding region and the adjacent confinement region must not exceed a few $10^{-2}$. Moreover, losses by dispersion are introduced, which are due to the diffraction produced by the lateral roughness.

Figure 2:
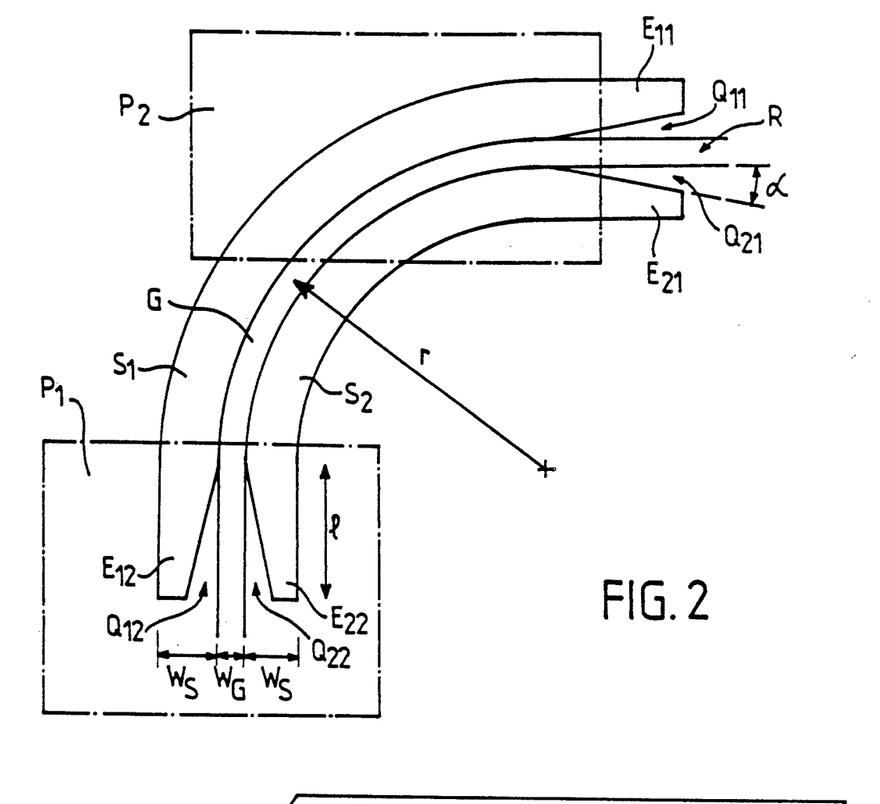
FIG. 2 shows these means for confinement of the light in a curved guide according to the invention.

According to the invention, these problems are solved by the device shown, viewed from above, in FIG. 2.

This device comprises an optical guide G limited at the surface by the ribbon R, which has at least one curved part having an average radius r and rectilinear parts. This device moreover comprises means for maintaining the path of the optical wave in the guide G.

These means include two grooves $S_1$ and $S_2$ provided along the edges of the guide in the curved part of the latter. According to the invention, these grooves have a constant depth with respect to the upper surface of the device or with respect to another reference plane, for example the substrate. They have a constant transverse dimension $W_S$ in the curved part of the guide, but their ends $E_{11}$, $E_{12}$ for $S_1$ and $E_{21}$, $E_{22}$ for $S_2$, respectively, have a transverse dimension which gradually decreases when the end of the groove is approached so that, the outer edges of the grooves remaining parallel to the edges of the guide, the edges of the grooves closest to the edges of the guide are separated from the latter so as to leave between them strips $Q_{11}$, $Q_{12}$, $Q_{21}$, $Q_{22}$ forming a corner having an angle $\alpha$. The ends $E_{11}$, $E_{12}$, $E_{21}$, $E_{22}$ extend over a length l on either side of the end of the curved part of the guide.

Figure 3:
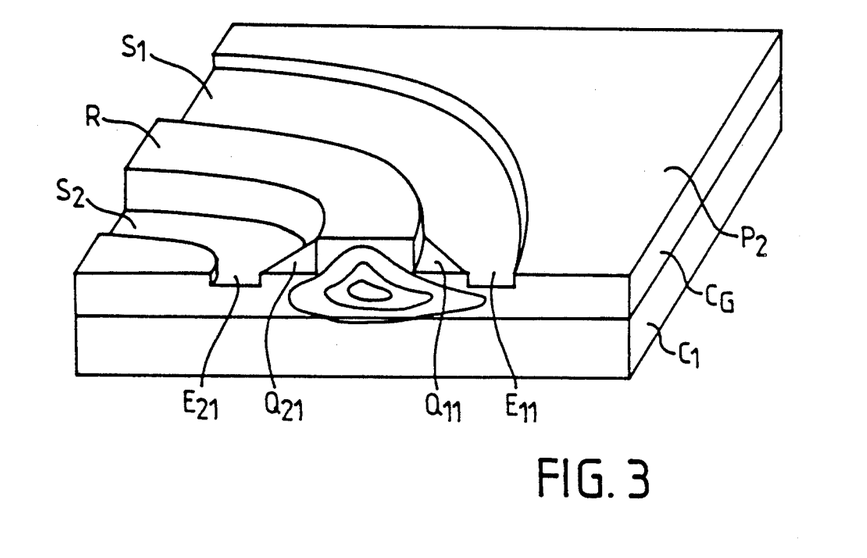
FIG. 3 shows in perspective view the part $P_2$ of FIG. 2 in a first embodiment.
Figure 4:
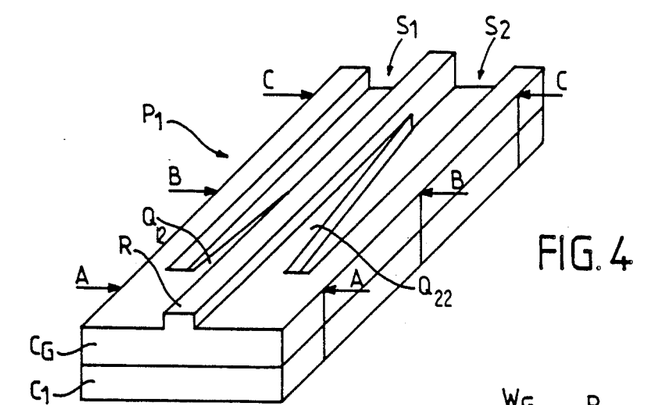
FIG. 4 shows in perspective view the part $P_1$ of FIG. 2 in the same embodiment.
Figure 5A:
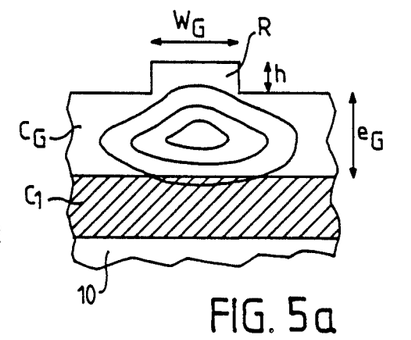
FIGS. 5a to 5c are diagrammatic cross-sections of the part $P_1$ of FIG. 4 taken on different planes.
Figure 5B:
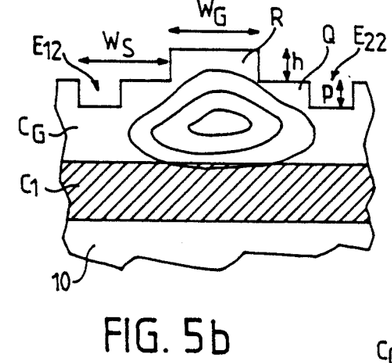
Figure 5C:
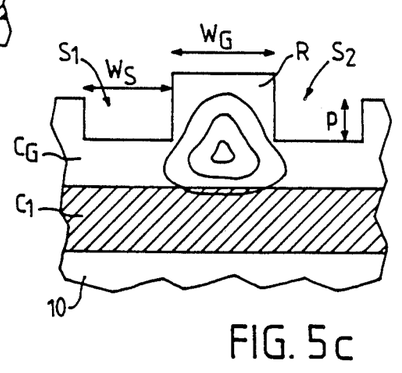

These means also include the fact that, as shown in perspective view in FIGS. 3 and 4 or in sectional view in FIGS. 5a, 5b, 5c, the optical guide is constituted by at least two layers $C_1$ and $C_G$, over which is provided a ribbon R in relief on the latter layer.

The layer $C_1$ is a confinement layer having a lower refractive index than the layer $C_G$ covering it. The layer $C_G$ is the guiding layer, i.e. that layer in which the wave propagates. The ribbon R formed at the surface of the guiding layer limits the optical path followed by the wave in the guiding layer.

This ribbon R favorably has a transverse dimension $W_G$ larger than the height h, by which it is erected above the device.

In these conditions, the mode conversion can be avoided by two cooperating means: on the one hand, due to the fact that the grooves are removed from the guided region by an angle $\alpha$ as soon as the guide becomes rectilinear; on the other hand, due to the fact that the grooves are not provided over the whole thickness of the guiding layer, but only over a part p which generally does not exceed 20% of the thickness $e_G$ of the guiding layer $C_G$.

This proportion is calculated as a function of the wavelength transported and of the indices of the materials in order both to obtain the confinement of the beam in the curved part of the guide and to avoid the mode conversions.

Therefore, by the use of the means according to the invention, i.e.:

a guiding layer over which a thin guiding ribbon is arranged having a curved part, grooves provided with respect to the edges of the guiding ribbon in the curve part, which are removed therefrom by an angle $\alpha$ from the ends of the curved parts, which are hollowed out over a depth less than the thickness of the guiding layer, (a) the beam has very low losses in the rectilinear parts due to the fact that there is no lateral diffusion, (b) at the same time, this beam can be readily coupled laterally to another beam, whose wave propagates in the same guiding layer, (c) this beam has very low losses in the curved part; the radius of curvature can be extremely small, of the order of 50 $\mu$m, (d) since the groove does not reach the base of the guiding layer, any mode conversion can be avoided, (e) since the depth of the groove is comparatively small, the losses due to the lateral diffusion by diffraction over the walls are very small.

Thus, a device associated with the means according to the invention has a particularly high performance.

EXAMPLE I

FIGS. 3, 4 and 5 illustrate an embodiment of a device comprising an integrated waveguide provided with the means according to the invention.

The guide structure is a homo-structure which may be formed, for example, on a semi-insulating substrate 10 of InP by confinement layer $C_1$ having a low index of $n^+$ type InP, on which are disposed a guiding layer $C_G$ of $n^-$ type InP and a thin ribbon R of the same material.

Other binary materials of the III-V group of the same conductivity type and of different resistivity may also be used to obtain the preceding homo-structure.

The global structure of the device is that of FIG. 2, viewed from above. The part $P_2$ of this FIG. 2 is shown in detail in perspective view in FIG. 3. This Figure shows the guiding ribbon R in relief on the guiding layer $C_G$, which is extended on the confinement layer $C_1$ and on the substrate 10. On either side of the ribbon R and in coincidence with its edges, the grooves $S_1$ and $S_2$ are disposed, whose bottom does not reach the lower part of the guiding layer $C_G$. From the end of the curved part, the grooves $S_1$ and $S_2$ are removed from the edges of the ribbon R so as to cause the corners $Q_{21}$ and $Q_{11}$ of the material of the guiding layer $C_G$ to appear. The grooves $S_1$ and $S_2$ in these parts $E_{21}$ and $E_{11}$ then have a transverse dimension smaller than in the region of the curved part.

The $P_1$ part of the device of FIG. 2 is shown in detail in perspective view in FIG. 4. The same elements as in the preceding FIG. 3 can be seen.

For a better understanding of the phenomenon of propagation of the wave in the guiding layer, FIGS. 5a to 5c show sectional views of the device shown in FIG. 4 taken on the planes AA, BB and CC, respectively.

FIG. 5a corresponds to the sectional view AA through a plane perpendicular to the guide in a rectilinear part.

No groove is provided in this region. The layer $C_G$ has a thickness $e_G$. The ribbon R has a transverse dimension $W_G$ and a height h. The confinement layer has a refractive index $n_1$ lower than the index $n_G$ of the guiding layer.

FIG. 5c corresponds to the sectional view CC through a plane perpendicular to the guide at the origin of the curved region. The grooves $S_1$ and $S_2$ are etched by prolongation of the edges of the guiding ribbon R. The depth of the grooves $S_1$, $S_2$ with respect to the upper level of the guiding layer is p. The width of the grooves on either side of R is $W_S$.

It has been found that, although the grooves are not etched over the whole thickness of the guiding layer, this etching is sufficient to produce beam compression without loss of propagated energy of the beam, whose section then takes the form shown by the iso-energy curves in this sectional view 5c.

FIG. 5b corresponds to the sectional view BB through a plane perpendicular to the guide in a region between the sectional view AA and the sectional view CC.

The parts $E_{12}$ and $E_{22}$ of the grooves $S_1$ and $S_2$ show the compression of the beam so as to cause its section to pass from the form shown by the iso-energy curves of FIG. 5a to the form shown by the iso-energy lines of FIG. 5c.

It should be noted that the etched depth p of the parts $E_{12}$, $E_{22}$ is the same as that of the grooves $S_1$, $S_2$. The length of the parts $E_{12}$, $E_{22}$, $E_{11}$, $E_{21}$ is l.

EXAMPLE II

Figures 6, 7A, 7B, 7C:
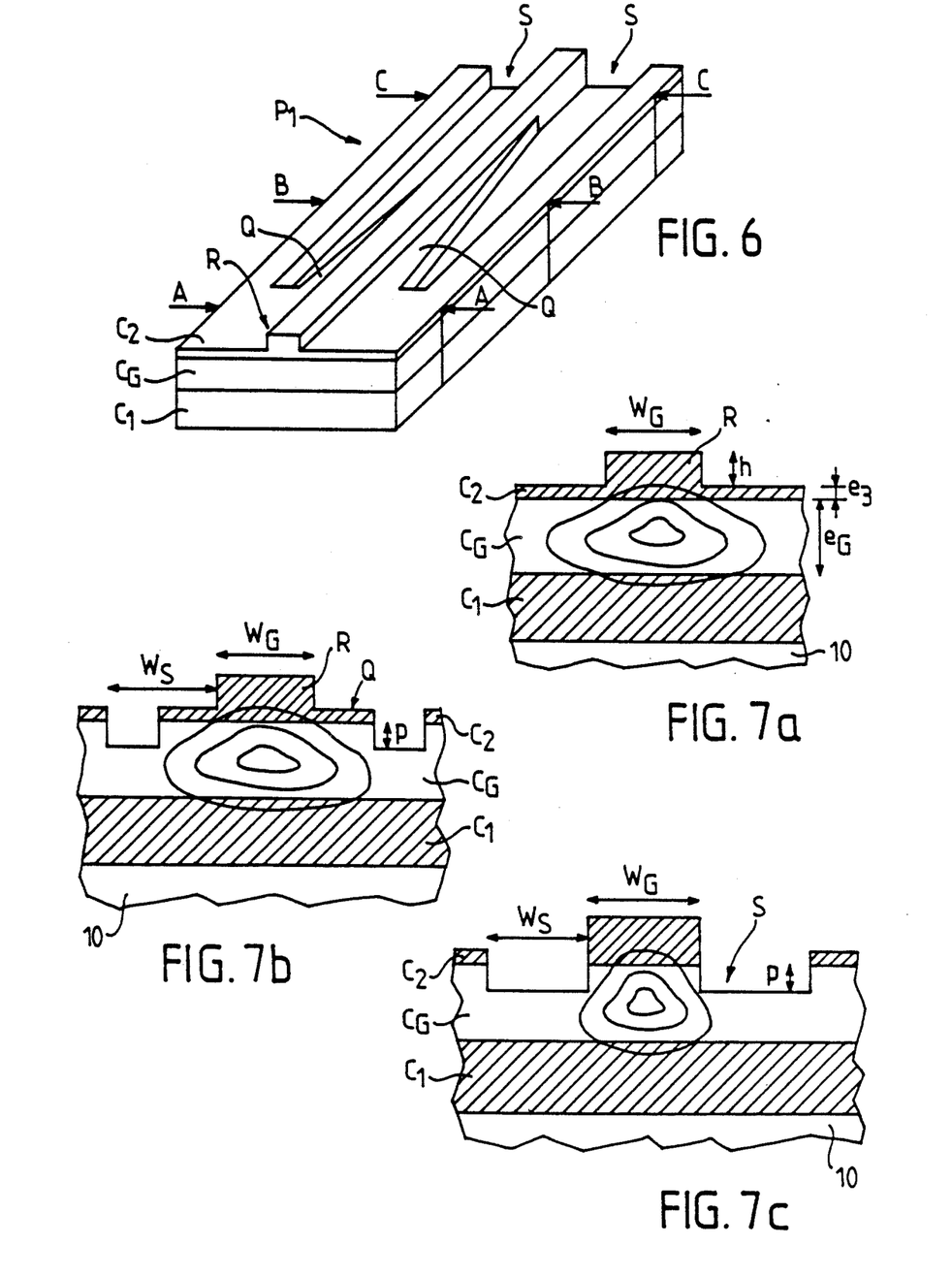
FIG. 6 shows in perspective view the part $P_1$ of FIG. 2 in another embodiment.
FIGS. 7a to 7c show diagrammatic cross-sections of the part $P_1$ of FIG. 6 taken on different planes.

FIGS. 6 and 7 illustrate a second embodiment of the invention.

The guide structure is a hetero-structure, which may be formed, for example, on a semi-insulating substrate 10 of InP successively by a confinement layer $C_1$ of low index of InP, by a guiding layer $C_G$ of GaInAsP having a slightly higher index and by a new confinement layer $C_2$, at whose surface is formed the thin guiding ribbon R of the same material.

Other materials III-V may be used to form this double hetero-structure, for example, a substrate and confinement layer of a binary material and a guiding material of a ternary or quaternary material having the required index and having a forbidden band width suitable to be transparent to the radiation used.

FIG. 6 is a perspective view of the part $P_1$ of FIG. 2.

FIGS. 7a to 7c are sectional views taken on AA, BB and CC, respectively, of FIG. 6. The second confinement layer $C_2$ having a very small thickness $e_3$ exhibits a slight improvement of the performances with respect to the device of Example I to be brought into equilibrium, with a supplementary technological step of forming this layer.

The remainder of the device is substantially the same as that of Example I.

Hereinafter an advantageous manufacturing method is moreover proposed for carrying out the invention. In fact, since the object aimed at by the invention is the integration of devices including waveguides in a semiconductor material with high performances and especially very low losses in a curved part having a very curved part having a very small radius of curvature, the manufacturing method must be particularly considered to this end while permitting of realizing the device in synergy with the realization of other integrated elements.

MANUFACTURING METHOD

The manufacturing method according to the invention will therefore comprise on the one hand the step of forming an external buried optical guide having a guiding ribbon and including at least one curved part of small radius of curvature and on the other hand the step of forming grooves for confining the light to maintain the guidance along the axis of the ribbon in the curved part.

This method will be carried out in three successive steps necessitating for the two last respective steps two masks of different kind, i.e. of different materials permitting selective etching treatments.

A. First step

Figure 9A:
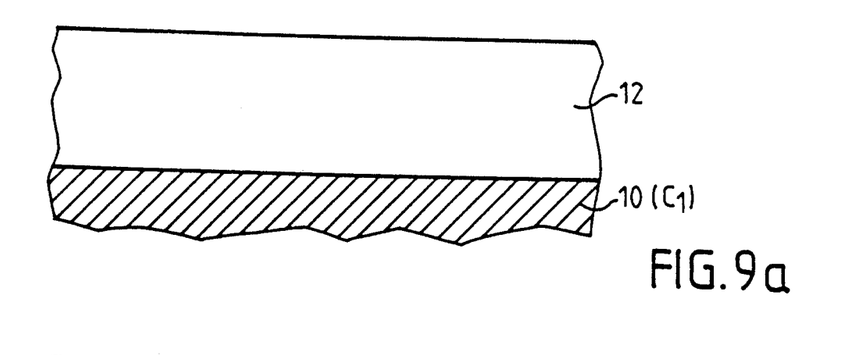
FIGS. 9 illustrate the first stage of the manufacturing method in two embodiments described.
Figure 9B:
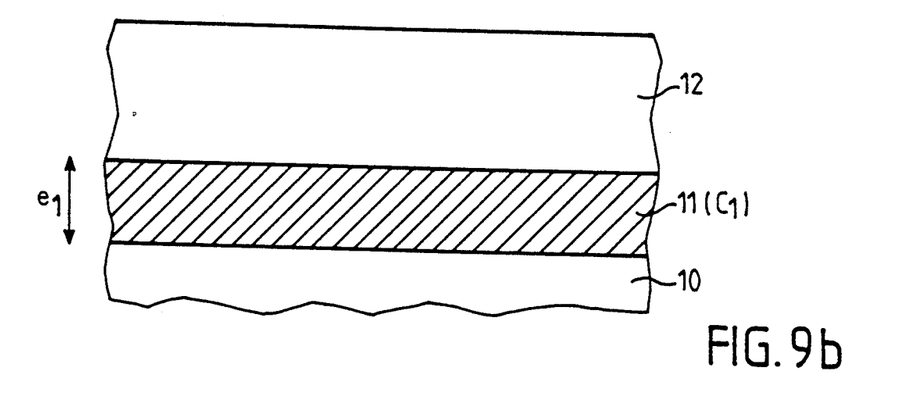
Figure 9C:
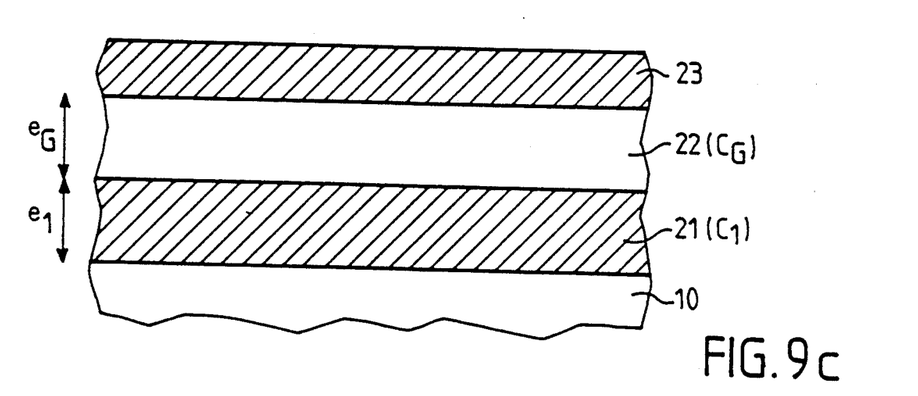

In the first step, the structure of juxtaposed layers will be formed, from which the devices according to the invention will be realized, i.e. a structure comprising at least one layer of low index, on which a layer is disposed having a slightly higher index and comprising, as the case may be, an upper layer of lower index (cf. FIGS. 9a to 9c).

Thus, in order to obtain the homo-structure of the Example I, first the substrate 10 is formed by cutting a slice from a solid block of semi-insulating InP obtained, for example, by drawing according to the Czochralski method with liquid encapsulation (cf. FIG. 9b).

Subsequently, by a method of epitaxy, such as MOVPE or VPE, a layer 11 of InP of the n+ type is formed, which is obtained, for example, by doping with the aid of S+ ions at a concentration of about $4.10^{18}$ per cm$^3$ covered by a layer 12 of InP of the n− type obtained without intentional doping (cf. FIG. 9b).

The thickness of the layer 11 is not critical. It may be, for example, $e_1 = 3$ μm. The layer 11 will be used as the confinement layer $C_1$. The thickness of the layer 12 is favorably 3 μm. In fact, this layer 12, which due to its n− conductivity type has a refractive index slightly higher than that of the layer 11, will serve to form the guiding layer $C_G$ having a thickness $e_G$ and the ribbon R having a thickness h. From a layer 12 having a thickness of 3 μm, by the method according to the invention a guiding layer $C_G$ having a thickness:

$e_G = 2.5$ μm and a ribbon having a height $h \simeq 0.5$ μm will be obtained.

In a general manner, attempts are made to obtain:

$1.5 < e_G < 2.5$ μm $0.5 < h < 0.75$ μm and $W_G \simeq 4$ μm from a layer 12 having a thickness lying between 2 and 3 μm.

In this embodiment, the material InP of the n− type is transparent to radiations having wavelengths $\lambda = 1.3$ μm and $\lambda = 1.55$ μm.

In a variation of the homo-structure of the Example I, a substrate 10 of the n+ conductivity type is used. It will then serve to confine the light if directly at its surface an epitaxial layer 12 of the n− conductivity type is formed, as has been described above (cf. FIG. 9a).

In order to obtain the double hetero-structure of the Example II, first a substrate 10 is formed by a method identical to that used in Example I.

Subsequently, again by epitaxy of the MOVPE or VPE type, a layer 21 of InP is formed without intentional doping intended to constitute the confinement layer $C_1$, whose thickness is not critical and may be of the order of $e_1 = 3$ μm.

At the surface of the layer 21, an epitaxial layer 22 of GaInAsP is then formed. The thickness of the layer 22 favourably lies between 1.5 and 2.5 μm (cf. FIG. 9c).

In fact, this quaternary layer 22 will be used as the guiding layer $C_G$ having a thickness $e_G$.

In this embodiment, the quaternary material GaInAsP is transparent to radiation having a wavelength $\lambda = 1.3$ μm or $\lambda = 1.55$ μm used actually for telecommunication purposes.

At the surface of the quaternary layer 22, finally a new binary layer 23 of InP is formed, whose thickness will favorably be 1 μm. In this layer 23, the ribbon R having a height $h \simeq 0.5$ μm and a width $W_G \simeq 4$ μm will be formed, like in Example I. The remaining thickness of the layer 23 at the surface of the layer 22 will then be $e_3$ lying between 0.25 and 0.5 μm according to the height h (cf. FIG. 9c) ($0.5 < h < 0.75$ μm).

The index difference between the binary material (of lower index) and the quaternary material permits of confining the light in the layer $C_G$ 22.

B. Second step

At the end of the formation of one or the other of these structures of flat epitaxial layers, the second step of the method according to the invention begins, whose operations are illustrated in FIGS. 10 and 11 for the structures of the Examples I and II, respectively. In this second step, the ribbon R in relief is formed on the upper layer of semiconductor material 12 or 23.

For this purpose, first a masking system $M_1$, $M_2$ is realized. For example, this system may be obtained by means of a layer 31 of a dielectric material, such as SiO$_2$, having a thickness of 500 to 700 nm and densified by sintering at 420° C. for 30 min. This silica layer 31 is then covered by a layer 32 of photoresist having a thickness of 0.7 to 1 μm, which is sintered for the first time at 90° C. for 30 min (cf. FIGS. 10a and 11a). Once insulated and dissolved, this layer 32 leaves behind a mask $M_2$ at the surface of the area provided for the ribbon R. Subsequently, the device is brought stepwise to a temperature of 180° C. to harden the photoresist layer $M_2$ (cf. FIGS. 10b and 11b).

Figure 10A:
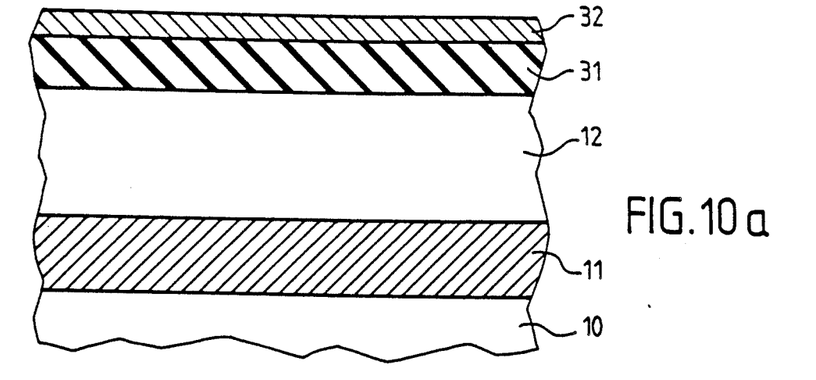
FIGS. 10 illustrate the second and the third stage of the manufacturing method in the first embodiment described.
Figure 10B:
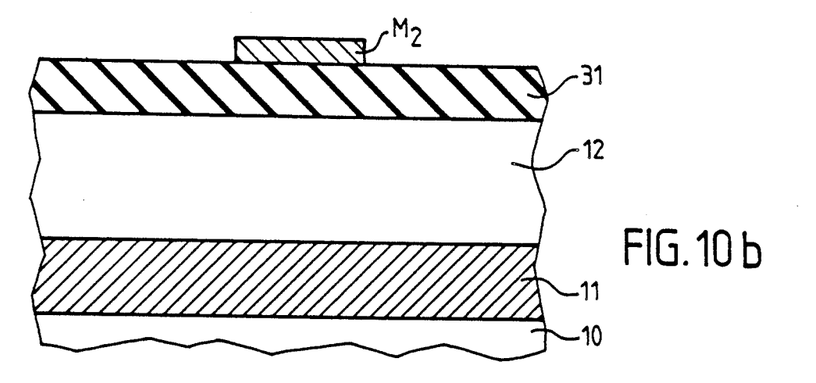
Figure 10C:
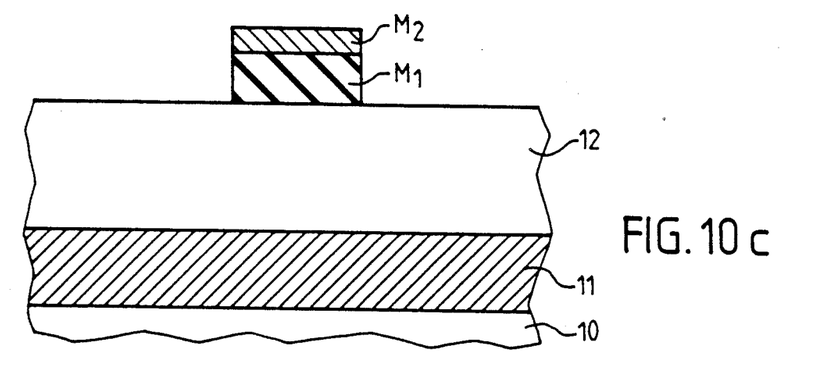
Figure 10D:
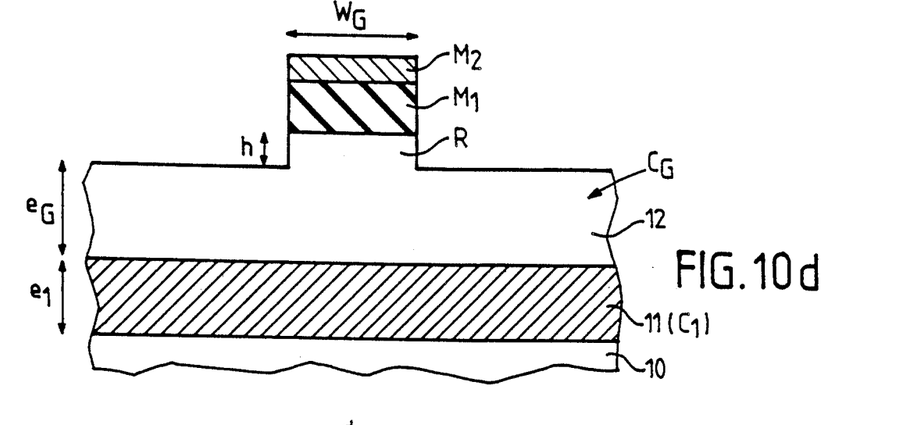
Figure 10E:
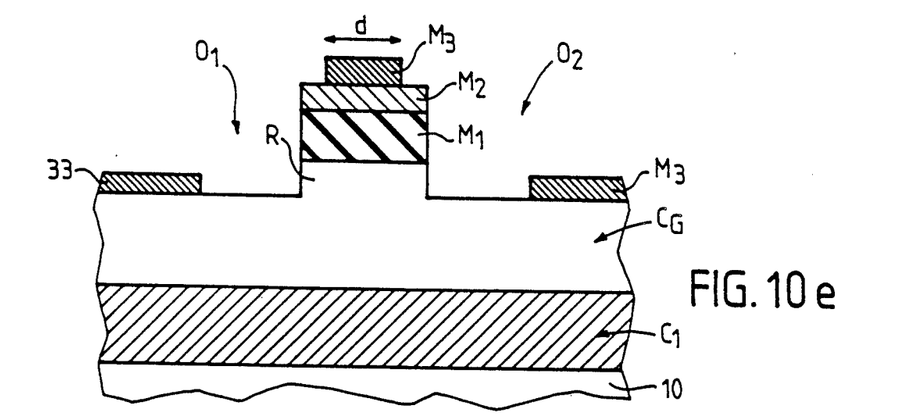
Figure 11A:
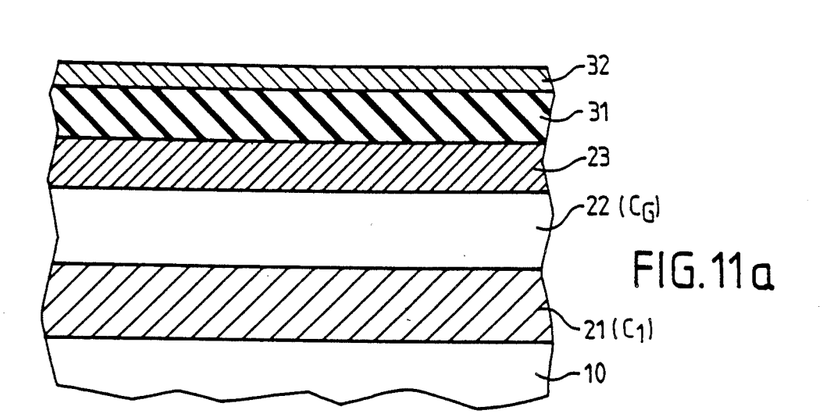
FIGS. 11 illustrate the second and the third stage of the manufacturing method in the second embodiment described.
Figure 11B:
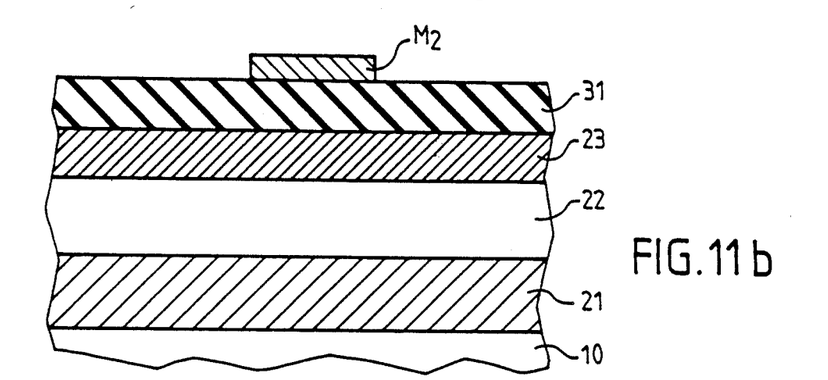
Figure 11C:
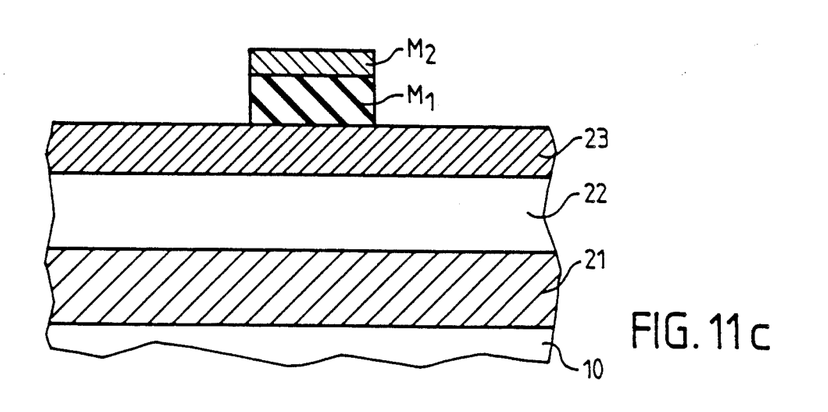
Figure 11D:
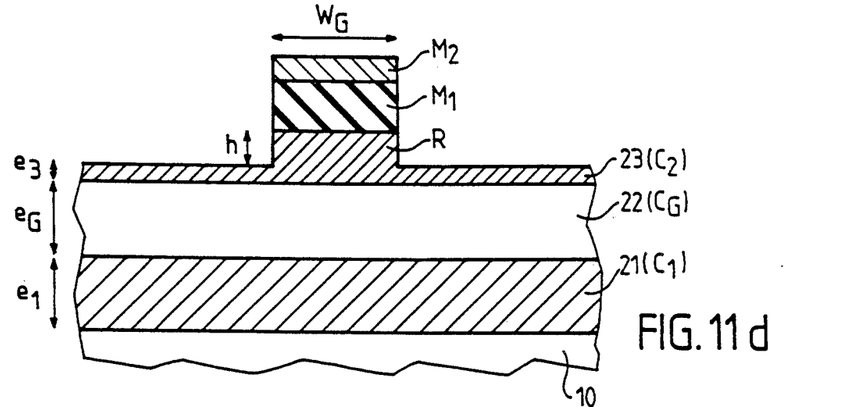
Figure 11E:
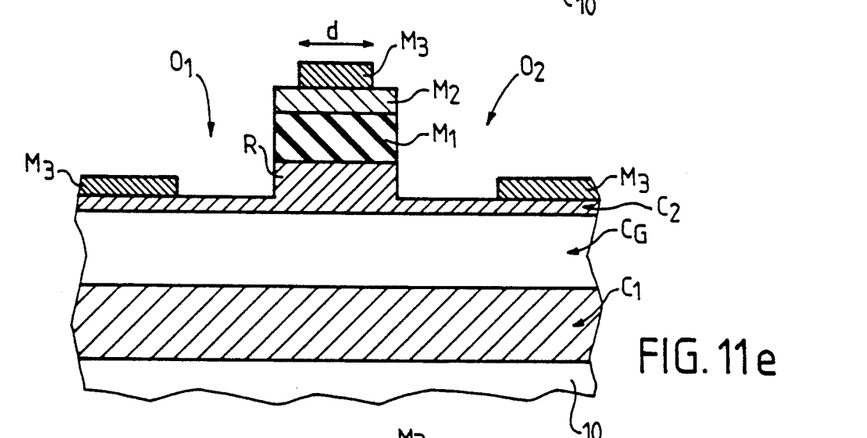

The silica layer 31 protected at the area of the mask $M_2$ is etched by the so-called reactive ion etching process until the upper surface of the semiconductor structure is attained by means of CHF$_3$ gas, then forming under the mask $M_2$ the mask $M_1$ of the same shape and surface (cf. FIGS. 10c and 11c).

When the upper surface of the semiconductor structure is attained, the reactive ion etching process is continued around the masking system $M_1$, $M_2$, for example by means of gas, such as a $CH_4/H_2$ mixture. The use of this mixture for etching the III-V compounds containing the element In is known from the publication entitled "A Novel Process for Reactive Ion Etching on InP, Using $CH_4/H_2$" by U. Niggerbrügge, M. Klug and G. Garus in "Int. Symp. GaAs and Related Compounds, Karauizawa, Japan, 1985" of "Institute Phys. Compt. Serv. No. 79, Chapter 6", pp. 367-372.

The masking system described above is chosen in order that it can support during the process of etching the semiconductor materials the use of other gases, especially chlorinated compounds.

The desired etching depth in the semiconductor structure is the height h of the ribbon R. This etching process is therefore carried out according to the structure in the layer 12 or in the layer 23, which consists in the two examples described above of InP material.

The control of the etched depth can be effected in real time, while using the method described in French Patent Application filed under number 87 07 796 (cf. FIGS. 10d and 11d) and corresponding U.S. Pat. No. 4,927,785.

The ribbon R having a height h thus being formed, remains covered by the masks $M_1$ of silica ($SiO_2$) and $M_2$ of photoresist, while the third step of the method according to the invention begins.

C. Third step

In order to carry out this third step, which consists in forming the grooves $S_1$ and $S_2$ having a width $W_S = 1$ to 4 $\mu$m in the curved parts of the guide, that is to say along the edges of the ribbon R in the curved parts of the guide, first a layer 33 of photoresist is formed, which covers the whole assembly of the device over a thickness of 2 to 4 $\mu$m.

By insulation and then dissolution, in this photoresist layer 33 windows are opened which coincide with the surface of the grooves $S_1$ and $S_2$ to be formed (cf. FIGS. 10e and 11e), thus forming a mask $M_3$.

Figures 8A, 8B:
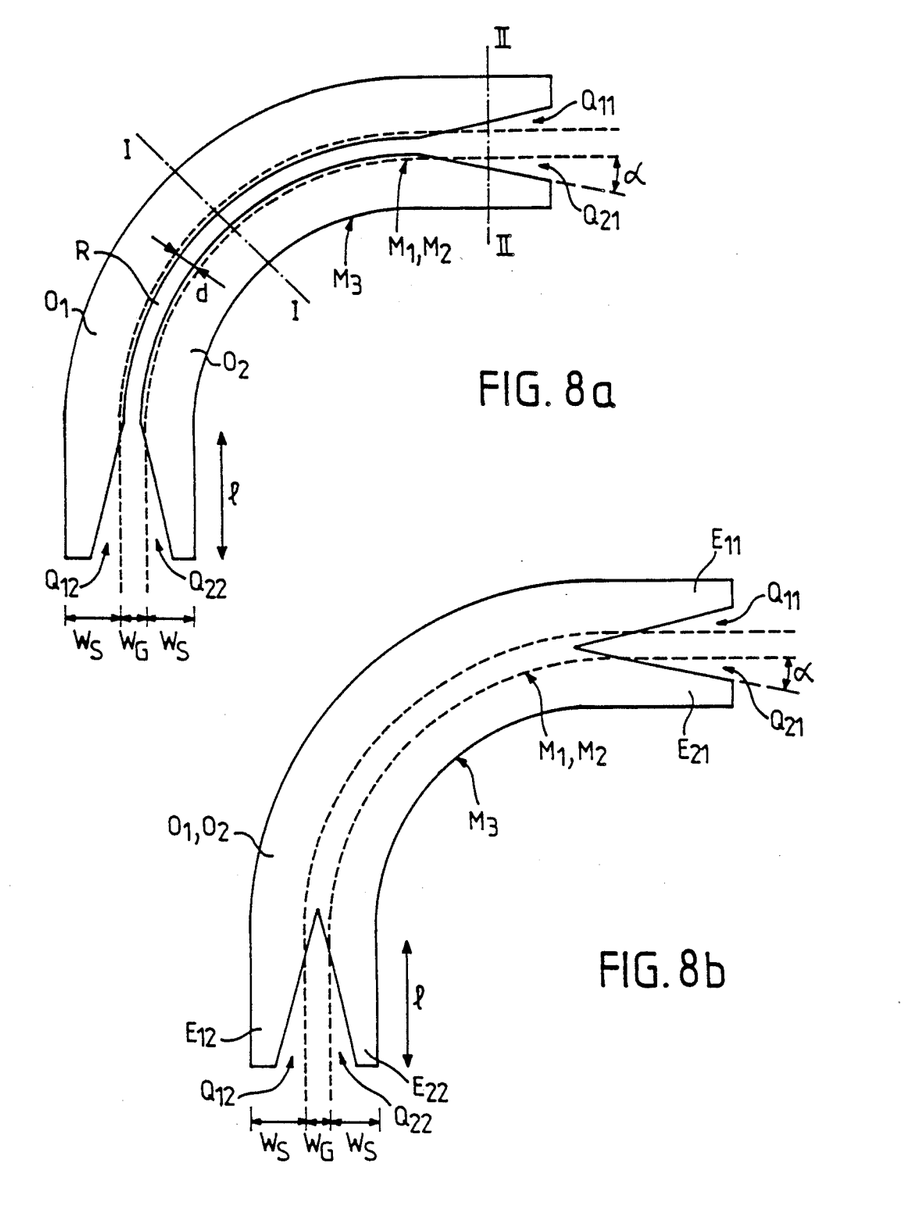
FIGS. 8 show two possible relative arrangements of the masks for carrying out the manufacturing method.

FIG. 8a shows, viewed from above, particular arrangement of the mask $M_3$ opposite to the superimposed masks $M_1$ and $M_2$, in which two windows $O_1$ and $O_2$ are opened, which are in coincidence with the grooves $S_1$ and $S_2$ to be formed, taking, however, the precaution to provide the distance d between $O_1$ and $O_2$ above $M_1$ and $M_2$ so as to be smaller than the dimension $W_G$ of the ribbon R (or of the masks $M_1$, $M_2$). In this manner, the edges of the grooves farthest remote from the ribbon R are limited by the mask $M_3$, while the edges of the grooves closest to the ribbon R are limited by the superimposed masks $M_1$, $M_2$.

FIG. 8b shows, viewed from above, a particularly advantageous arrangement of the mask $M_3$, in which the openings $O_1$ and $O_2$ are joined above $M_1$, $M_2$ so as to form only one opening having the form of a dovetail at each end for forming the parts $E_{11}$, $E_{12}$, $E_{21}$, $E_{22}$ of the grooves $S_1$ and $S_2$. These parts $E_{11}$, $E_{12}$, $E_{21}$, $E_{22}$ will favourably have a dimension:

$l \simeq 50 \mu m$ (cf. FIG. 2)

In these conditions, the edges of $S_1$ and $S_2$ farthest remote from the ribbon R are limited by $M_3$ and the edges closest to R are limited by $M_1$, $M_2$, as shown in FIGS. 10e, 11e and 10g, 11g, which are sectional views of FIG. 8a taken on the planes I—I and II—II, respectively.

In the openings $O_1$, $O_2$ according to the configuration chosen, the layer or layers of semiconductor material, that is to say the layer 12 in the case of the homo-structure of Example I and the layers 23, 22 in the case of the hetero-structure of Example II, is or are etched until the layer $C_G$ of material 12 or 22 is attacked over a small thickness, at any rate less than 2% of its overall thickness. An etching over a depth p of the order of 5 to 16% of its overall thickness is to be preferred. For example, for an overall thickness $e_G$ of 1.5 $\mu$m of the layer 22, a depth p for the grooves in this layer 22 of about 0.2 $\mu$m can be chosen.

The layers 12 or 23, 22 are etched by reactive ion etching, as described above, by the same gases $CH_4/H_2$ in the same conditions.

It should be noted that the choice of the materials for forming the two masking systems necessary for the realization of the device has been made so that the masks $M_1$, $M_2$ are kept intact during the formation of the mask $M_3$. Other materials are possible for the realization of these two masking systems provided that on the one hand they yield this result and that on the other hand the masks thus formed are not deformed and especially are not etched by means of the same gases as those used for etching the semiconductor structures.

Figure 10F:
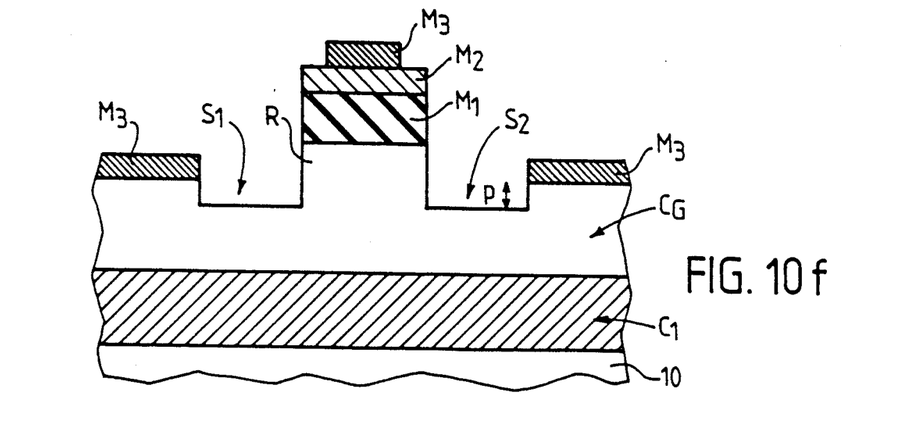
Figure 10G:
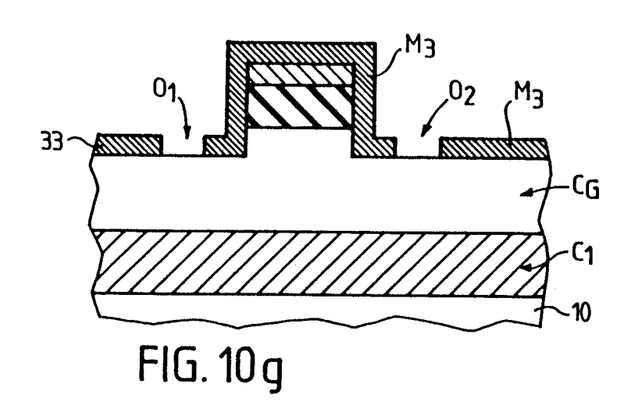
Figure 10H:
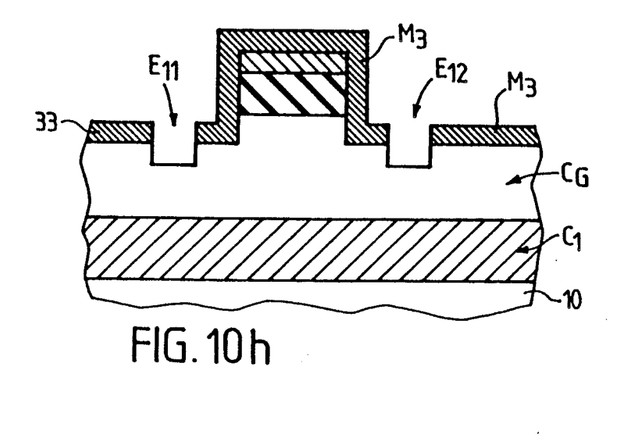
Figure 11F:
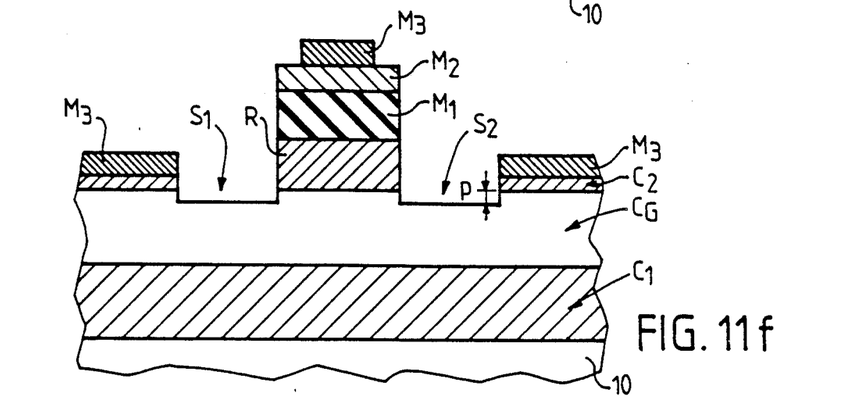
Figure 11G:
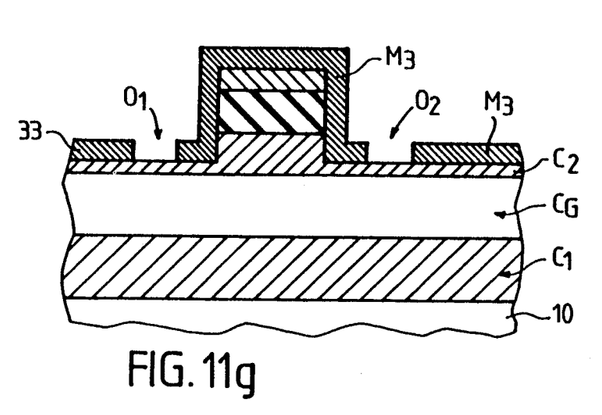
Figure 11H:
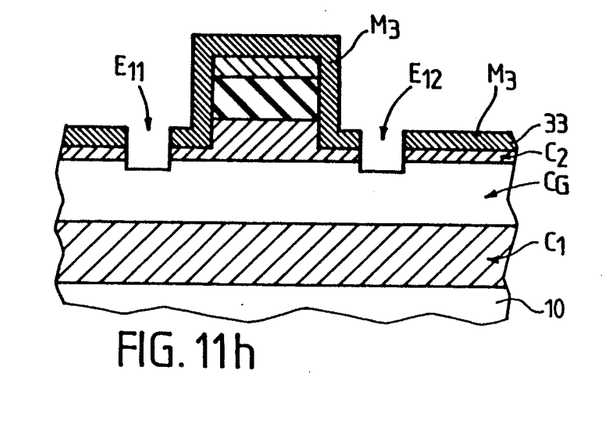

FIGS. 10f and 10h show the result of the etching process in the openings $O_1$ and $O_2$ taken on the sections I—I and II—II of FIG. 8a for the structure of the example I, and FIGS. 11f and 11h show the same result taken on the same sections for the structure of the example II.

The arrangement of the masks with respect to each other as shown in FIG. 8a and more specifically in FIG. 8b is also particularly advantageous. In fact, due to the fact that the edges of the grooves are limited by $M_1$, $M_2$ along the ribbon, the etching treatment of the grooves along the ribbon R in the third step is effected perfectly in alignment with the etching treatment by which the ribbon R is formed in the second step.

The arrangement of FIG. 8a, though slightly less simple than that of FIG. 8b, leads to the same result.

The method according to the invention permits obtaining perfect self-alignment of the edges of the grooves with respect to the edges of the ribbons because the masks are aligned with respect to each other. Thus, the unfavorable effects of the roughness of the edges of the guide are minimized.

At the end of the process, the mask $M_2$ (layer 32) of photoresist is eliminated by dissolution in acetone and the mask $M_1$ (layer 31) of silica is eliminated by means of hydrofluoride (HF). The mask $M_3$ of photoresist is also eliminated in acetone.

Finally, it should be noted that the formation of a groove in the concave part of the curve of the guide is not absolutely indispensable. However, this formation facilitates the execution, increases the performance and improves also the confinement of the light in the guide.

We claim:

1. A semiconductor device, comprising: an integrated optical guide, which has at least one rectilinear part and one curved part, and means for confining light in the guide in the curved part, the means for confining comprising a groove provided along an edge of the guide in the region of the curved part, a guiding layer and, overlying said guiding layer, a guiding ribbon in relief for determining the optical path followed by the light in the guiding layer, and the groove having a constant depth, a central part which exactly follows the edge of the guiding ribbon in the curved part, ends which diverge from the edge of said ribbon at the beginning and at the end of the curved part, and a bottom disposed in the guiding layer at a level which does not reach the lower part of said guiding layer.

2. A device as claimed in claim 1, having a groove of the same structure on either side of the guide in its curved part.

3. A device as claimed in claim 1, characterized in that the ends of the groove diverge from the guiding ribbon by an angle of 2° to 5°.

4. A device as claimed in claim 3, characterized in that the angle is 3°.

5. A device as claimed in claim 3, characterized in that the angle is 4°.

6. A device as claimed in claim 1, characterized in that the groove has a depth in a thickness direction of the guiding layer less than 20% of the thickness of said guiding layer.

7. A device as claimed in claim 1, characterized in that the structure of the guide is of the type having two layers, such that the guiding layer is formed at the surface of an underlying confinement layer having a lower index than the guiding layer and that the guiding ribbon is formed at the surface of the guiding layer from the same material as the guiding layer.

8. A device as claimed in claim 7, characterized in that the structure of the guide having two layers is of the homo-structure type such that the confinement layer is made of a III-V material of a given conductivity type at a first level of resistivity and the guiding layer is made of the same III-V material of the same conducitivity type at a second level of resistivity formed on a substrate of a material of the III-V group.

9. A device as claimed in claim 8, characterized in that the confinement layer is n+ and the guiding layer comprises a ribbon of n− InP formed on a substrate of semi-insulating InP.

10. A device as claimed in claim 1, characterized in that the structure of the guide is of the type having three layers such that the guiding layer is formed between two confinement layers of lower index than the guiding layer, the guiding ribbon being made of the material of the upper layer.

11. A device as claimed in claim 10, characterized in that the guide structure comprising three layers is of the hetero-structure type and the two confinement layers being made of a binary III-V material and the guiding layer being made of a material selected from the group consisting of ternary and quaternary III-V materials, the substrate consisting of a binary III-V material.

12. A device as claimed in claim 11, characterized in that the confinement layers are made of InP and the guiding layer is made of GaInAsP formed on a substrate of semi-insulating InP.

13. A device as claimed in claim 1, characterized in that the guiding layer has a thickness of about 1.5 $\mu$m, the confinement layer, has a thickness of 0.25 $\mu$m, the guiding ribbon forms a relief having a thickness of about 0.75 $\mu$m and a transverse dimension of about 4 $\mu$m, and the groove has a depth and a bottom disposed at about 0.2 $\mu$m from the upper surface of the guiding layer.

14. A device as claimed in claim 2, characterized in that the ends of the groove diverge from the guiding ribbon by an angle of 2° to 5°.

15. A device as claimed in claim 14, characterized in that the angle is 3°.

16. A device as claimed in claim 14, characterized in that the angle is 4°.

17. A device as claimed in claim 2, characterized in that the structure of the guide is of the type having two layers, such that the guiding layer is formed at the surface of an underlying confinement layer having a lower index than the guiding layer and that the guiding ribbon is formed at the surface of the guiding layer from the same material as the guiding layer.

18. A device as claimed in claim 3, characterized in that the structure of the guide is of type having two layers, such that the guiding layer is formed at the surface of an underlying confinement layer having a lower index than the guiding layer and that the guiding ribbon is formed at the surface of the guiding layer from the same material as the guiding layer.

19. A device as claimed in claim 14, characterized in that the structure of the guide is of the type having two layers, such that the guiding layer is formed at the surface of an underlying confinement layer having a lower index than the guiding layer and that the guiding ribbon is formed at the surface of the guiding layer from the same material as the guiding layer.

20. A device as claimed in claim 2, characterized in that the structure of the guide is of the type having three layers such that the guiding layer is formed between two confinement layers of lower index than the guiding layer, the guiding ribbon being made of the material of the upper layer.

21. A device as claimed in claim 3, characterized in that the structure of the guide is of the type having three layers such that the guiding layer is formed between two confinement layers of lower index than the guiding layer, the guiding ribbon being made of the material of the upper layer.

22. A device as claimed in claim 14, characterized in that the structure of the guide is of the type having three layers such that the guiding layer is formed between two confinement layers of lower index than the guiding layer, the guiding ribbon being made of the material of the upper layer.

* * * * *